(12) United States Patent
Chakra et al.

(10) Patent No.: US 8,914,658 B2
(45) Date of Patent: Dec. 16, 2014

(54) HIBERNATION DURING MEETINGS

(75) Inventors: Al Chakra, Apex, NC (US); Itzhack Goldberg, Hadera (IL); Liam Harpur, Skerries (IE); John Rice, Tramore (IE)

(73) Assignee: International Business Machines Corporation, Armonk, NY (US)

( * ) Notice: Subject to any disclaimer, the term of this patent is extended or adjusted under 35 U.S.C. 154(b) by 332 days.

(21) Appl. No.: 12/984,845

(22) Filed: Jan. 5, 2011

(65) Prior Publication Data

US 2012/0173908 A1 Jul. 5, 2012

(51) Int. Cl.
*G06F 1/00* (2006.01)
*G06F 1/32* (2006.01)

(52) U.S. Cl.
CPC ........... *G06F 1/3231* (2013.01); *G06F 1/3206* (2013.01); *G06F 1/3209* (2013.01)
USPC ......................................................... 713/323

(58) Field of Classification Search
CPC . G06F 1/3203; G06F 1/3234; G06F 2201/86; G06F 9/4418; G06F 1/3209; G06F 1/3231; G06F 1/3206; H04L 67/28; H04L 63/0281; H04W 88/182; H04W 52/00; H04W 52/02; H04W 52/283; H04M 1/72572; H04M 3/42348
USPC ......................................................... 713/323
See application file for complete search history.

(56) References Cited

U.S. PATENT DOCUMENTS

| | | | |
|---|---|---|---|
| 5,915,119 A * | 6/1999 | Cone | 713/310 |
| 7,162,629 B2 | 1/2007 | Zimmer et al. | |
| 7,519,808 B2 | 4/2009 | Reece et al. | |
| 7,640,440 B2 | 12/2009 | Reece et al. | |
| 2003/0236890 A1 | 12/2003 | Hurwitz et al. | |
| 2007/0067445 A1 | 3/2007 | Vugenfirer et al. | |
| 2007/0100986 A1 | 5/2007 | Bagley et al. | |
| 2007/0127425 A1 | 6/2007 | Keidar et al. | |
| 2008/0270814 A1 * | 10/2008 | Starr et al. | 713/323 |
| 2009/0031124 A1 | 1/2009 | Das | |
| 2009/0172163 A1 | 7/2009 | Carroll et al. | |
| 2009/0210519 A1 * | 8/2009 | Zill et al. | 709/220 |
| 2009/0217072 A1 * | 8/2009 | Gebhart et al. | 713/330 |
| 2010/0115084 A1 | 5/2010 | Caspi et al. | |
| 2010/0218011 A1 | 8/2010 | Diab et al. | |
| 2010/0235668 A1 * | 9/2010 | Cheshire | 713/323 |
| 2012/0072751 A1 * | 3/2012 | Das et al. | 713/323 |

OTHER PUBLICATIONS

Bruce Nordman et al., "Improving the Energy Efficiency of Ethernet-Connected Devices: A Proposal for Proxying", Sep. 2007, version 1.0.*

(Continued)

*Primary Examiner* — Mohammed Rehman
*Assistant Examiner* — Xuxing Chen
(74) *Attorney, Agent, or Firm* — Holland & Knight LLP; Brian J. Colandreo, Esq.; Jeffrey T. Placker, Esq.

(57) ABSTRACT

A method, computer program product, and system for hibernation during meetings is described. A method may comprise designating a base computer system of a meeting. The method may further comprise determining if a user is in the meeting. The method may also comprise hibernating a computer system associated with the user based upon, at least in part, a hibernation policy, if it is determined that the user is in the meeting.

16 Claims, 7 Drawing Sheets

(56) References Cited

OTHER PUBLICATIONS

Chiaravigilio et al., "PoliSave: Efficient Power Management of Campus PCs," SoftCOM International Conference, Sep. 23-25, 2010, pp. 82-87.

IBM et al., "A Method to communicate Current Meeting Attendance Status to Other Attendees," IPCOM000172103D, Jun. 27, 2008, 3 pages.

* cited by examiner

HIBERNATION DURING MEETINGS

BACKGROUND OF THE INVENTION

Users of computer systems may often attend meetings. These users may desire to be in communication with others by, for example, email, instant message chat, or social network, while in the meetings. Further, these users may wish to receive news updates while in the meetings. In order to be in communication with others or receive news, the users may have to leave their computer systems fully powered during the meetings. If left fully powered during meetings, these computer systems may consume large amounts of energy.

BRIEF SUMMARY OF THE INVENTION

In a first embodiment, a method may include designating a base computer system of a meeting. The method may further include determining if a user is in the meeting. The method may also include hibernating a computer system associated with the user based upon, at least in part, a hibernation policy, if it is determined that the user is in the meeting.

One or more of the following features may be included. The method may include designating the user as online by proxy via the base computer system. The method may also include providing a status indicating that the user is online by proxy. The method may further include determining if there is a wake-up trigger for the computer system associated with the user based upon, at least in part, a wake-up policy. The method may additionally include waking up the computer system associated with the user based upon, at least in part, the wake-up trigger. The method may furthermore include providing an indication, via the base computer system, that the user has been sent a communication corresponding to the wake-up trigger.

In some implementations, determining if the user is in the meeting may include at least one of determining if the meeting is scheduled in a calendar associated with the user, determining a location of the user based upon, at least in part, an RFID tag associated with the user, monitoring a routing of IP packets associated with the computer system associated with the user, and determining a proximity of the computer system associated with the user to other computer systems. The hibernation policy may include, at least in part, at least one of a number of computer systems to be hibernated during the meeting, and a percentage of computer systems to be hibernated during the meeting. Further, the wake-up policy may be based upon, at least in part, at least one of an organizational hierarchy, a corporate directory, a social network, and a trust relationship. Additionally, the wake-up trigger may be at least one of a sent email, a sent instant message, a sent social networking message, and a newsfeed. The method may also include hibernating a plurality of computer systems based upon, at least in part the hibernation policy.

In a second embodiment, a computer program product may reside on a computer readable storage medium and may have a plurality of instructions stored on it. When executed by a processor, the instructions may cause the processor to perform operations including designating a base computer system of a meeting. The operations may further include determining if a user is in the meeting. The operations may also include hibernating a computer system associated with the user based upon, at least in part, a hibernation policy, if it is determined that the user is in the meeting.

One or more of the following features may be included. The operations may include designating the user as online by proxy via the base computer system. The operations may also include providing a status indicating that the user is online by proxy. The operations may further include determining if there is a wake-up trigger for the computer system associated with the user based upon, at least in part, a wake-up policy. The operations may additionally include waking up the computer system associated with the user based upon, at least in part, the wake-up trigger. The operations may furthermore include providing an indication, via the base computer system, that the user has been sent a communication corresponding to the wake-up trigger.

In some implementations, determining if the user is in the meeting may include at least one of determining if the meeting is scheduled in a calendar associated with the user, determining a location of the user based upon, at least in part, an RFID tag associated with the user, monitoring a routing of IP packets associated with the computer system associated with the user, and determining a proximity of the computer system associated with the user to other computer systems. The hibernation policy may include, at least in part, at least one of a number of computer systems to be hibernated during the meeting, and a percentage of computer systems to be hibernated during the meeting. Further, the wake-up policy may be based upon, at least in part, at least one of an organizational hierarchy, a corporate directory, a social network, and a trust relationship. Additionally, the wake-up trigger may be at least one of a sent email, a sent instant message, a sent social networking message, and a newsfeed. The operations may also include hibernating a plurality of computer systems based upon, at least in part the hibernation policy.

In a third embodiment, a computing system is provided. The computing system may include at least one processor and at least one memory architecture coupled with the at least one processor. The computing system may also include a first software module executed on the at least one processor and the at least one memory architecture, wherein the first software module is configured to designate a base computer system of a meeting. Further, the computing system may include a second software module configured to determine if a user is in the meeting. Additionally, the computing system may include a third software module configured to hibernate a computer system associated with the user based upon, at least in part, a hibernation policy, if it is determined that the user is in the meeting.

One or more of the following features may be included. The computing system may also include a fourth software module configured to designate the user as online by proxy via the base computer system. The computing system may further include a fifth software module configured to provide a status indicating that the user is online by proxy.

The details of one or more implementations are set forth in the accompanying drawings and the description below. Other features and advantages will become apparent from the description, the drawings, and the claims.

DETAILED DESCRIPTION OF THE INVENTION

Figure 1:
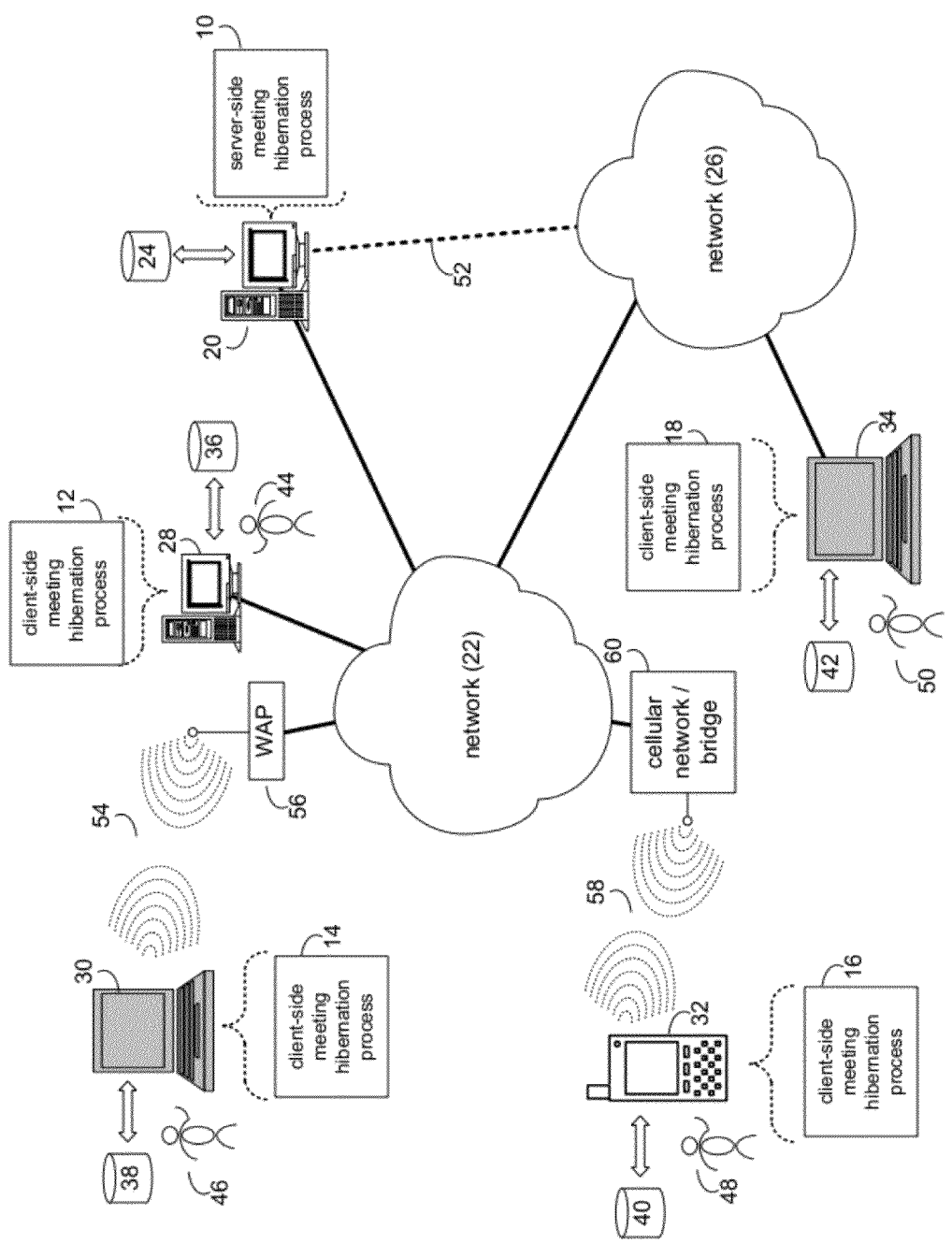
FIG. 1 is a diagrammatic view of a meeting hibernation process coupled to a distributed computing network.
Figure 2:
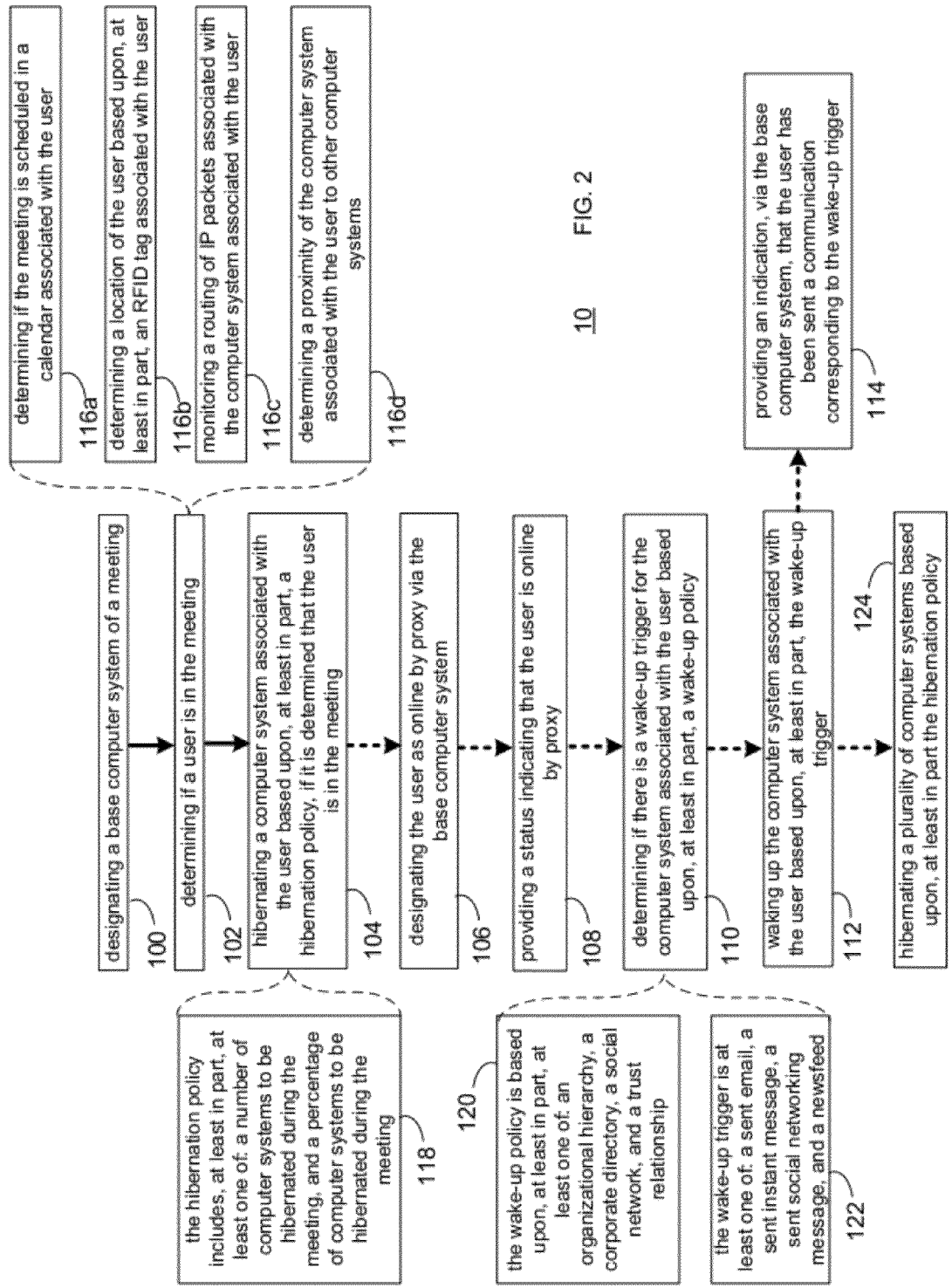
FIG. 2 is a flowchart of the meeting hibernation process of FIG. 1.
Figure 3:
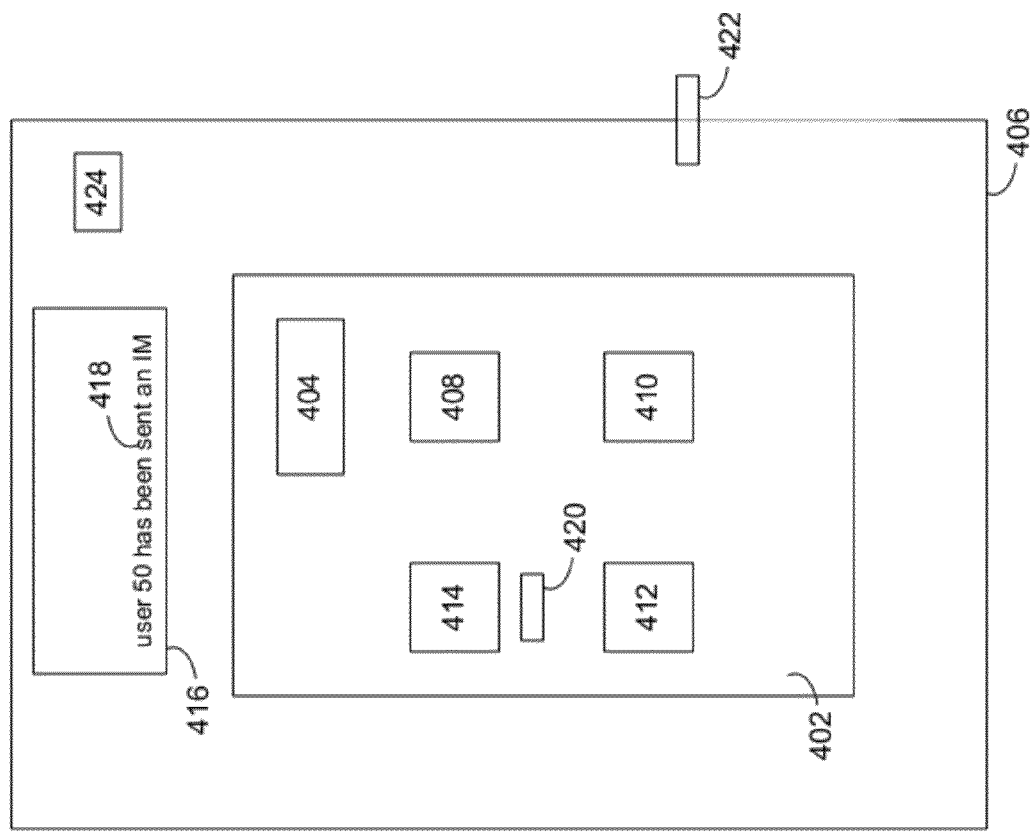
FIG. 3 is an exemplary meeting room which may be associated with the meeting hibernation process of FIG. 1.
Figure 4:
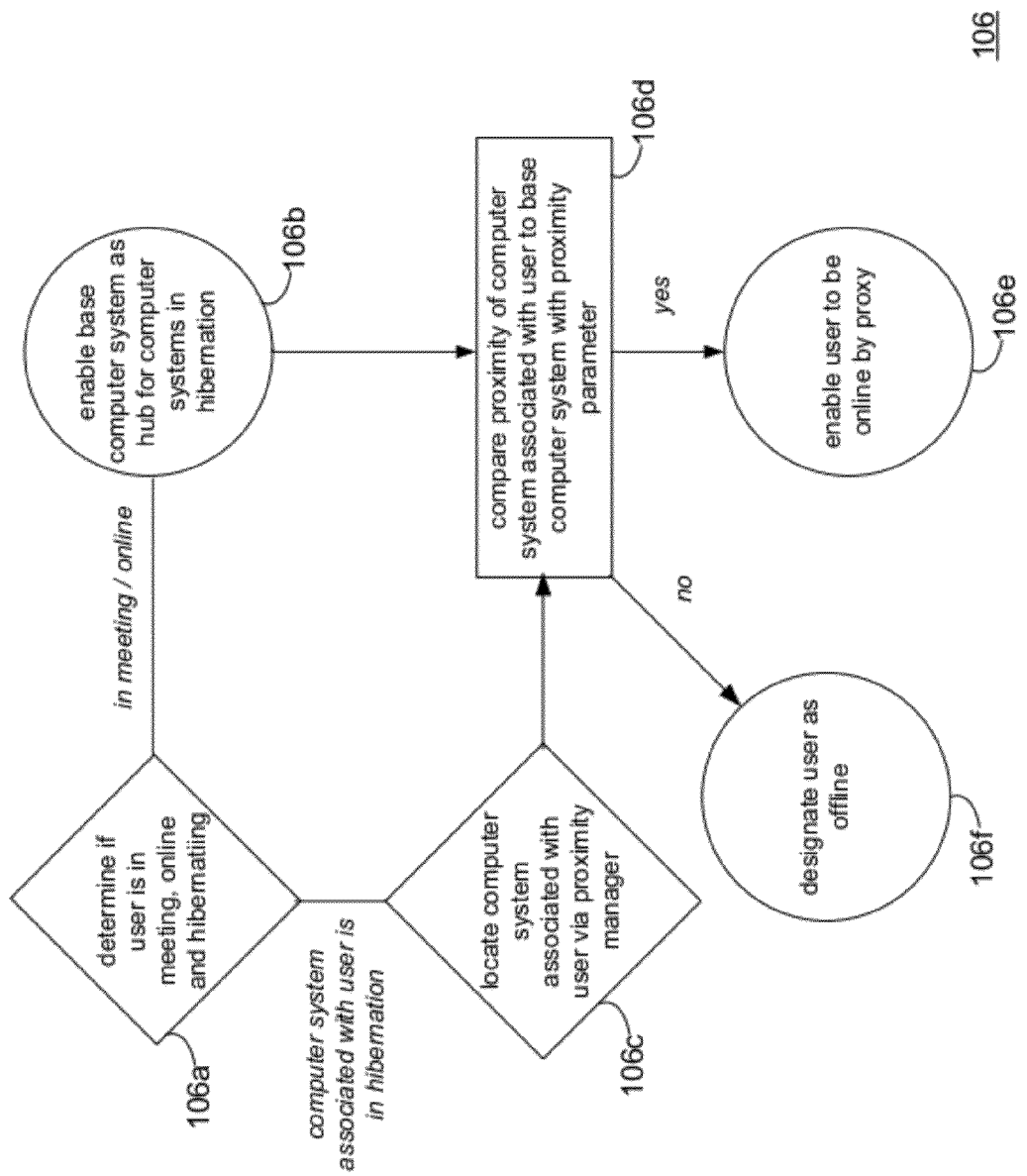
FIG. 4 is a flowchart associated with the meeting hibernation process of FIG. 1.

Referring to FIGS. 1 & 2, there is shown a meeting hibernation process 10. As will be discussed below, meeting hibernation process 10 may designate 100 a base computer system of a meeting. Meeting hibernation process 10 may also determine 102 if a user is in the meeting.

Meeting hibernation process (MH) process may be a server-side process (e.g., server-side MH process 10), a client-side process (e.g., client-side MH process 12, client-side MH process 14, client-side MH process 16, or client-side MH process 18), or a hybrid server-side/client-side process (e.g., the combination of server-side MH process 10 and one or more of client-side MH processes 12, 14, 16, 18).

Server-side MH process 10 may reside on and may be executed by server computer 20, which may be connected to network 22 (e.g., the Internet or a local area network). Examples of server computer 20 may include, but are not limited to: a personal computer, a server computer, a series of server computers, a mini computer, and/or a mainframe computer. Server computer 20 may be a web server (or a series of servers) running a network operating system, examples of which may include but are not limited to: Microsoft® Windows Server®; Novell® Netware®; or Red Hat® Linux®, for example.

The instruction sets and subroutines of server-side MH process 10, which may be stored on storage device 24 coupled to server computer 20, may be executed by one or more processors (not shown) and one or more memory architectures (not shown) incorporated into server computer 20. Storage device 24 may include but is not limited to: a hard disk drive; a tape drive; an optical drive; a RAID array; a random access memory (RAM); and a read-only memory (ROM).

Server computer 20 may execute a web server application, examples of which may include but are not limited to: Microsoft® IIS, Novell® Web Server, or Apache® Web Server, that allows for access to server computer 20 (via network 22) using one or more protocols, examples of which may include but are not limited to HTTP (i.e., HyperText Transfer Protocol), SIP (i.e., session initiation protocol), and the Lotus® Sametime® VP protocol. Network 22 may be connected to one or more secondary networks (e.g., network 26), examples of which may include but are not limited to: a local area network; a wide area network; or an intranet, for example.

Client-side MH processes 12, 14, 16, 18 may reside on and may be executed by client electronic devices 28, 30, 32, and/or 34 (respectively), examples of which may include but are not limited to personal computer 28, laptop computer 30, a data-enabled mobile telephone 32, notebook computer 34, personal digital assistant (not shown), smart phone (not shown) and a dedicated network device (not shown), for example. Client electronic devices 28, 30, 32, 34 may each be coupled to network 22 and/or network 26 and may each execute an operating system, examples of which may include but are not limited to Microsoft® Windows®, Microsoft Windows CE®, Red Hat® Linux®, or a custom operating system.

The instruction sets and subroutines of client-side MH processes 12, 14, 16, 18, which may be stored on storage devices 36, 38, 40, 42 (respectively) coupled to client electronic devices 28, 30, 32, 34 (respectively), may be executed by one or more processors (not shown) and one or more memory architectures (not shown) incorporated into client electronic devices 28, 30, 32, 34 (respectively). Storage devices 36, 38, 40, 42 may include but are not limited to: hard disk drives; tape drives; optical drives; RAID arrays; random access memories (RAM); read-only memories (ROM); compact flash (CF) storage devices; secure digital (SD) storage devices; and memory stick storage devices.

Client-side MH processes 12, 14, 16, 18 and/or server-side MH process 10 may be processes that run within (i.e., are part of) an email, calendaring and scheduling application, such as, for example, Microsoft® Outlook®. Alternatively, client-side MH processes 12, 14, 16, 18 and/or server-side MH process 10 may be stand-alone applications that work in conjunction with the email, calendaring and scheduling application. One or more of client-side MH processes 12, 14, 16, 18 and server-side MH process 10 may interface with each other (via network 22 and/or network 26).

Users 44, 46, 48, 50 may access server-side MH process 10 directly through the device on which the client-side MH process (e.g., client-side MH processes 12, 14, 16, 18) is executed, namely client electronic devices 28, 30, 32, 34, for example. Users 44, 46, 48, 50 may access server-side MH process 10 directly through network 22 and/or through secondary network 26. Further, server computer 20 (i.e., the computer that executes server-side MH process 10) may be connected to network 22 through secondary network 26, as illustrated with phantom link line 52.

The various client electronic devices may be directly or indirectly coupled to network 22 (or network 26). For example, personal computer 28 is shown directly coupled to network 22 via a hardwired network connection. Further, notebook computer 34 is shown directly coupled to network 26 via a hardwired network connection. Laptop computer 30 is shown wirelessly coupled to network 22 via wireless communication channel 54 established between laptop computer 30 and wireless access point (i.e., WAP) 56, which is shown directly coupled to network 22. WAP 56 may be, for example, an IEEE 802.11a, 802.11b, 802.11g, 802.11n, Wi-Fi, and/or Bluetooth device that is capable of establishing wireless communication channel 54 between laptop computer 30 and WAP 56. Data-enabled mobile telephone 32 is shown wirelessly coupled to network 22 via wireless communication channel 58 established between data-enabled mobile telephone 32 and cellular network/bridge 60, which is shown directly coupled to network 22.

As is known in the art, all of the IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. As is known in the art, Bluetooth is a telecommunications industry specification that allows e.g., mobile phones, computers, and personal digital assistants to be interconnected using a short-range wireless connection.

The Meeting Hibernation Process

For the following discussion, server-side MH process 10 will be described for illustrative purposes. It should be noted that client-side MH process 12 may be incorporated into server-side MH process 10 and may be executed within one or more applications that allow for communication with client-side MH process 12. However, this is not intended to be a limitation of this disclosure, as other configurations are possible (e.g., stand-alone, client-side MH processes and/or stand-alone server-side MH processes.) For example, some implementations may include one or more of client-side MH processes 14, 16, 18 in place of or in addition to client-side MH process 12.

Referring now to FIGS. 1-4, MH process 10 may designate 100 a base computer system (e.g., computer system 404) of a meeting (e.g., meeting 402). Meeting 402 may take place in meeting room 406 and may have multiple attendees. The attendees may be users of a network (e.g., network 22) administrated by an organization such as corporation. For example, one or more of users 44, 46, 48, and 50 may attend the meeting. Assume for illustrative purposes that users 44, 46, 48, and 50 attend meeting 402 in meeting room 406 and are associated with computer systems 408, 410, 412, and 414, respectively. In other words, users 44, 46, 48, and 50 may use computer systems 408, 410, 412, and 414, respectively, to sign into network 22. Further, users 44, 46, 48, and 50 may use computer systems 408, 410, 412, and 414, respectively, to communicate with other users within the organization, perform tasks, and access files. Computer systems 408, 410, 412, and 414 may be one or more of the client electronic devices (e.g., client electronic devices 28, 30, 32, 34) mentioned above, however, for illustrative purposes assume that computer systems 408, 410, 412, and 414 are laptop computers (e.g., laptop computer 30).

A base computer system may be designated by a user (e.g., users 44, 46, 48, and 50) of a computer system (e.g., computer systems 408, 410, 412, and 414). For example, computer system 404 may be designated as a base computer system by the user associated with computer system 404. Further, the user associated with base computer system 404 may give a presentation during meeting 402. Base computer system 404 may be in communication with a projector (not shown) projecting the user's presentation onto screen 416. Screen 416 may be visible to one or more of users 44, 46, 48, and 50 while in meeting room 406. In an implementation, base computer system 404 may be designated automatically by MH process 10. For example, MH process 10 may determine that base computer system 404 is centrally located relative to one or more of computer systems 408, 410, 412, and 414. For illustrative purposes, computer system 404 will be discussed herein as the base computer system in meeting 402, however any one of computer systems 408, 410, 412, and 414 may be designated as the base computer system in other examples.

Continuing with the above example, MH process 10 may determine 102 if the user (e.g., users 44, 46, 48, 50) is in meeting 402. MH process 10 may determine 102 if the user (e.g., users 44, 46, 48, 50) is in meeting 402 in a variety of ways, some of which will be described below. Further, MH process 10 may hibernate 104 a computer system (e.g., computer systems 408, 410, 412, 414) associated with the user (e.g., users 44, 46, 48, 50) based upon, at least in part, a hibernation policy, if it is determined 102 that the user (e.g., users 44, 46, 48, 50) is in meeting 402. The term "hibernate" as referred to herein may be used to describe putting a computer system into sleep mode, or otherwise configuring the computer system to use less power. When hibernating, a computer system may use so little power that it is unable to receive communications via network 22.

For example, MH process 10 may determine 102 that user 50 is in meeting 402. User 50 may be associated with computer system 414, which, as discussed above, may be a laptop computer such as laptop computer 30. MH process 10 may hibernate 104 computer system 414 associated with user 50. As discussed above, user 50 may be unable to receive communications via computer system 414 when computer system 414 is hibernating. Further, MH process 10 may designate 106 user 50 as online by proxy via the base computer system 404. While user 50 is online by proxy, a communication associated with user 50 may be evaluated by MH process 10 to determine if user 50 should be notified, via base computer system 404, that the communication was sent.

In an implementation, in order to designate 106 user 50 as online by proxy via the base computer system 404, MH process 10 may make a number of determinations and/or perform a number of operations. For example, and referring also to FIG. 4, MH process 10 may determine 106a if user 50 is in meeting 402, online (e.g., signed into network 22) and hibernating (e.g., computer system 414 is hibernating). Further, if user 50 is in meeting 402, and online (e.g., signed into network 22), MH process 10 may enable 106b base computer system 404 as a hub for computer systems (e.g., computer system 414) in hibernation. If computer system 414 associated with user 50 is in hibernation, MH process 10 may locate 106c computer system 414 associated with user 50 via a proximity manager. The proximity manager may be associated with MH process 10 and may use a monitoring engine to detect a physical location of meeting participants and their proximities to each other. As will be discussed below, MH process 10 may detect the physical location of meeting participants by monitoring the routing of IP packets and the ports/routers they may route through, by monitoring RFID signals, and by monitoring network addresses associated with computer systems of the meeting participants.

MH process 10 may further compare 106d the proximity of computer system 414 relative to base computer system 404, with a proximity parameter of base computer system 404. If the proximity of computer system 414 relative to base computer system 404 is within the proximity parameter, MH process 10 may enable 106e user 50 to be online by proxy (e.g., via base computer system 404). Further, if the proximity of computer system 414 relative to base computer system 404 is not within the proximity parameter, MH process 10 may designate 106f user 50 as offline.

Figure 5:
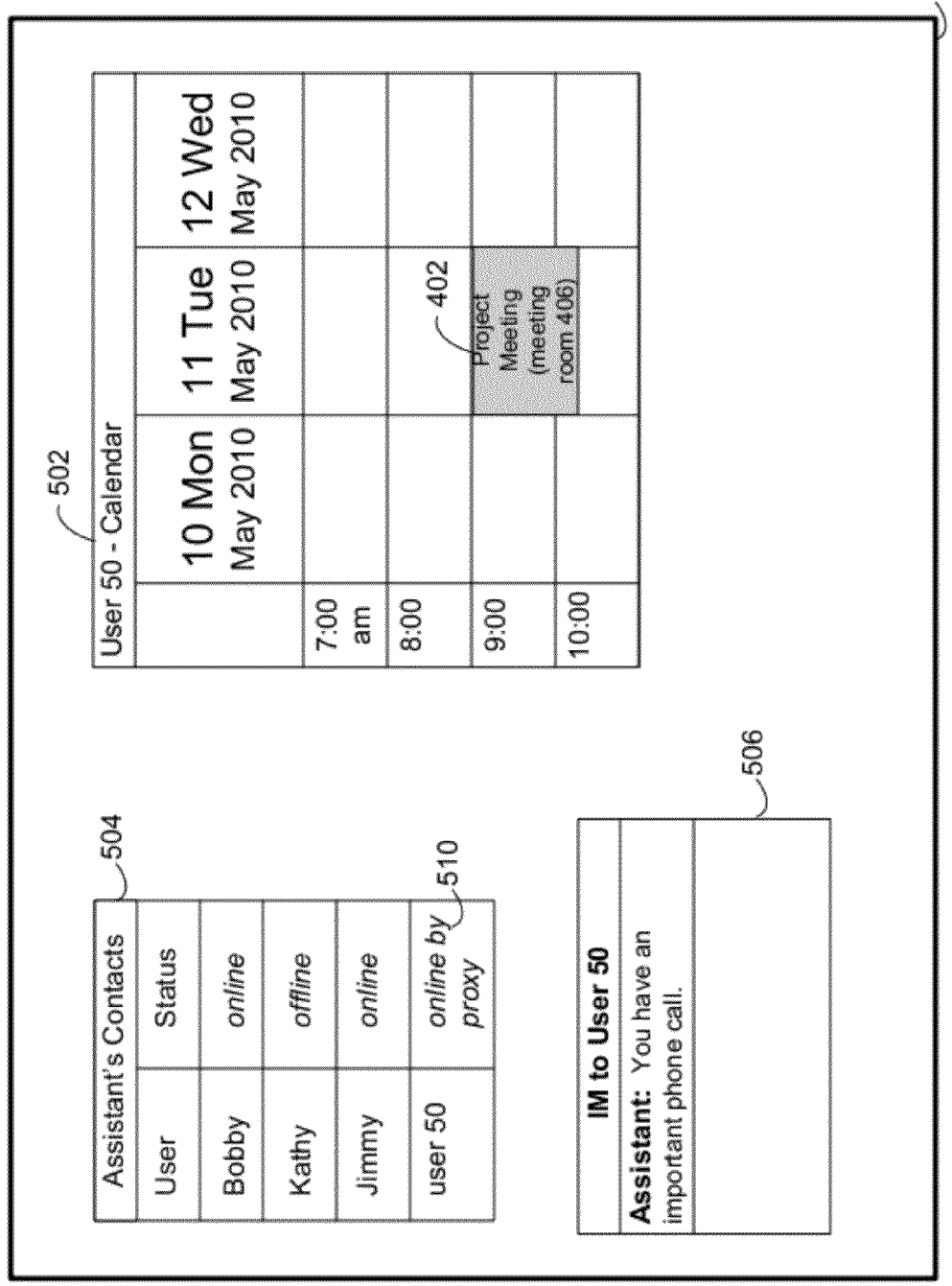
FIG. 5 is an exemplary computer screen which may be associated with a user.

Referring now also to FIG. 5, MH process 10 may additionally provide 108 a status (e.g., status 510) indicating that user 50 is online by proxy. For example, user 50 may have an assistant that may help user 50. The assistant may view computer screen 500 which may allow the assistant to interface with the assistant's computer system (not shown). The assistant may communicate with a number of users via an instant messaging application. Further, the assistant's contacts may be shown in a contact list 504 (i.e., a buddy list). Status 510 may be shown in the assistant's contact list (e.g., contact list 504) and may indicate to the assistant that user 50 is online by proxy. In this way, MH process 10 may allow users of the instant messaging application to be aware that a user (e.g., user 50) is online by proxy while the computer system (e.g., computer system 414) of the user is hibernating.

Figure 6:
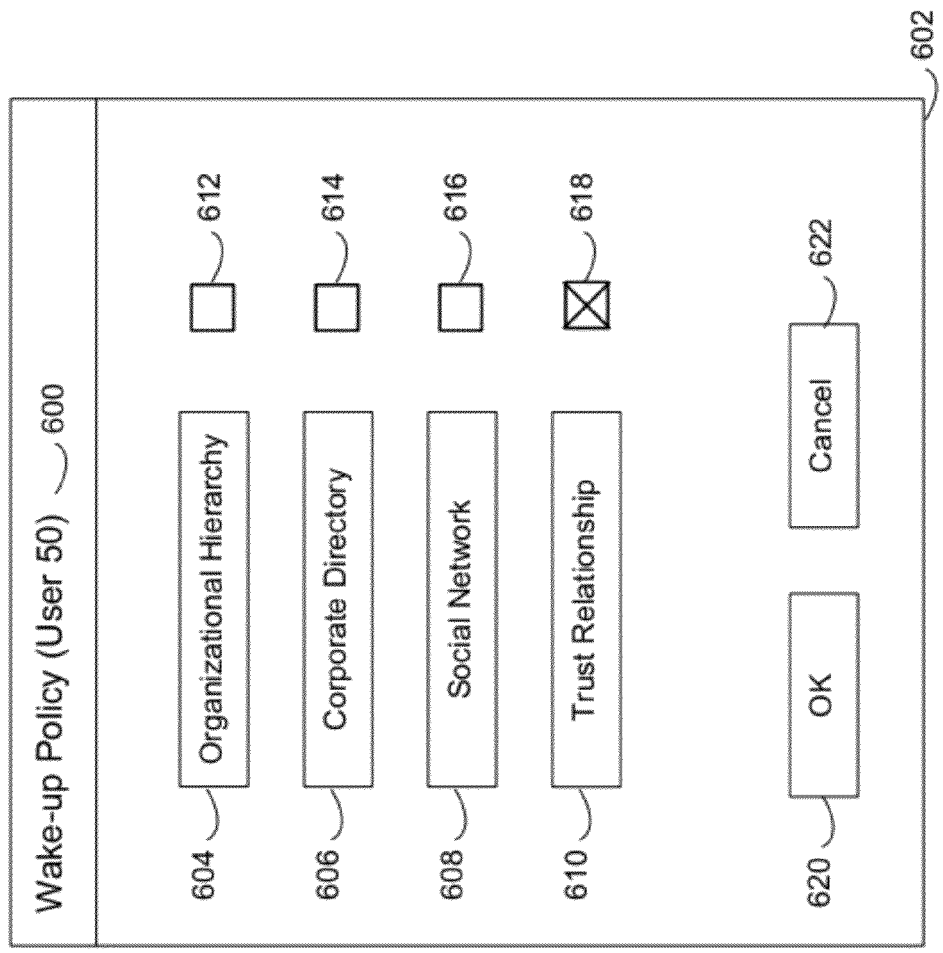
FIG. 6 is an exemplary graphical user interface which may be associated with the meeting hibernation process of FIG. 1.

Continuing with the above example, user 50 may receive an important phone call while in meeting 402. This phone call may be routed to the assistant of user 50 since user 50 is in meeting 402. The assistant may have access to a calendar (e.g., calendar 502) of user 50 and may see that user 50 has a meeting (e.g., meeting 402) scheduled at that time. Further, the assistant may view contact list 504 and may realize that user 50 is online by proxy, and may wish to communicate to user 50 that user 50 has an important phone call. As such, the assistant may send instant message (IM) 506 to user 50. Referring now also to FIG. 6, MH process 10 may determine 110 if there is a wake-up trigger (e.g., IM 506) for computer system 414 associated with user 50 based upon, at least in part, a wake-up policy (e.g., wake-up policy 600). The wake up trigger may be (122) at least one of a sent email, a sent instant message (e.g., IM 506), a sent social networking message (e.g., via Facebook™ and/or Twitter™) and a sent newsfeed. The sent newsfeed may include news deemed important by the user such as, for example, a stock quote. Further, wake-up policy 600 may be (120) based upon, at least in part, at least one of an organizational hierarchy, a corporate directory, a social network, and a trust relationship.

Wake-up policy 600 may be configured via popup interface 602. A user (e.g., user 50) may select one or more of checkboxes 612, 614, 616, and 618 in order designate that wake-up policy 600 be based upon, at least in part, one or more of an organizational hierarchy, a corporate directory, a social network, and a trust relationship. Further, the user (e.g., user 50) may select one or more of buttons 604, 606, 608, and 610 to further configure wake-up policy 600 by specifying various parameters related to an organizational hierarchy, a corporate directory, a social network, and a trust relationship, respectively. Buttons 604, 606, 608, and 610 may correspond to checkboxes 612, 614, 616, and 618, respectively. For example, if a user (e.g., user 50) wishes to configure wake-up policy 600 based upon, at least in part, a trust relationship, the user may select checkbox 618.

The user (e.g., user 50) may select button 610 to configure various parameters related to the trust relationship. For example, user 50 may have a trust relationship with e.g., his/her assistant and may wish to configure wake-up policy 600 based upon, at least in part, this trust relationship. As such, user 50 may select checkbox 618. Further, user 50 may select button 610 to configure various parameters related to the trust relationship. MH process 10 may render a popup interface (not shown), in response to the selection of button 610 by user 50. User 50 may configure, via the popup interface (not shown), a wake-up policy where, for example, all instant messages (e.g., IM 506) sent by his/her assistant qualify as wake-up triggers. User 50 may select button 620 to accept the wake-up policy configuration, or button 622 to cancel.

While wake-up policy 600 is discussed in this example as including a trust relationship between user 50 and his/her assistant, other configurations are possible. For example, wake-up policy 600 may be based upon, at least in part, an organizational hierarchy, wherein communications from users having a higher relative position and/or higher seniority than user 50 qualify as wake-up triggers. Wake-up policy 600 may also be set for user 50 by other users having a higher relative position and/or higher seniority than user 50. Wake-up policy 600 may also be based upon, at least in part, a level of importance associated with another user sending a communication to user 50, a social network proximity of user 50 relative to another user, a time and/or time periods (e.g., do not wake-up before 3:00 pm or between 5:00 pm and 6:00 pm), and a number of communications sent to user 50 (e.g., wake-up after 10 communications are sent to user 50, which may be recognized by a communication server application that may detect communications destined for user 50).

Continuing with the above example, in an implementation, MH process 10 may wake-up 112 computer system 414 associated with the user 50 based upon, at least in part, the wake-up trigger (e.g., IM 506). Further, in an implementation, MH process 10 may provide 114 an indication (e.g., indication 418), via base computer system 404, that user 50 has been sent a communication (e.g., IM 506) corresponding to the wake-up trigger (e.g., IM 506). It should noted that MH process 10 may wake up 112 computer system 414 associated with user 50 based upon, at least in part, the wake-up trigger (e.g., IM 506) without providing 114 the indication (e.g., indication 418). For example, in waking up 112 computer system 414, MH process 10 may take computer system 414 out of sleep mode, or otherwise configure computer system 414 to use enough power such that it can receive communications (e.g., IM 506) via network 22. It should also be noted that MH process 10 may provide 114 an indication (e.g., indication 418), via base computer system 404, that user 50 has been sent a communication (e.g., IM 506) corresponding to the wake-up trigger (e.g., IM 506) without waking up 112 computer system 414. MH process 10 may also both wake-up 112 computer system 414 associated with user 50 based upon, at least in part, the wake-up trigger (e.g., IM 506) and provide 114 an indication (e.g., indication 418), via base computer system 404, that user 50 has been sent a communication (e.g., IM 506) corresponding to the wake-up trigger (e.g., IM 506).

In an implementation, a do-not-disturb status may be propagated from a base computer system (e.g., base computer system 404) to one or more computer systems (e.g., computer systems 408, 410, 412, 414) that may be using the base computer system (e.g., base computer system 404) as a hub while hibernating. For example, the user of base computer system 404 may be giving a presentation and may come to an important point in the presentation. Further, the user may set up a do-not-disturb status deflecting any communications to the user and relaying a do-not-disturb status to the senders of those communications. This do-not-disturb status may be propagated to one or more users associated with the one or more computer systems (e.g., computer systems 408, 410, 412, 414) that may be using the base computer system (e.g., base computer system 404) as a hub while hibernating, such that senders of communications to users associated with the one or more computer systems (e.g., computer systems 408, 410, 412, 414) may also receive the indication of the do-not-disturb status.

As discussed above, MH process 10 may determine 102 if the user (e.g., users 44, 46, 48, 50) is in a meeting (e.g., meeting 402) and may use a monitoring engine to detect a physical location of meeting participants and their proximities to each other. Determining 102 if the user (e.g., users 44, 46, 48, 50) is in a meeting (e.g., meeting 402) may include determining 116a if a meeting (e.g., meeting 402) is scheduled in a calendar (e.g., calendar 502) associated with the user (e.g., users 44, 46, 48, 50). For example, MH process 10 may query a unified calendaring and scheduling system (e.g., Microsoft® Outlook®) to determine if a user (e.g., users 44, 46, 48, 50) has a meeting scheduled (e.g., meeting 402). If user 50 has meeting 402 scheduled in calendar 502, MH process 10 may assume that user 50 is in meeting 402 and therefore in meeting room 406.

Further, determining 102 if the user (e.g., users 44, 46, 48, 50) is in a meeting (e.g., meeting 402) may include determining 116b a location (e.g., meeting room 406) of the user (e.g., users 44, 46, 48, 50) based upon, at least in part, an RFID tag (e.g., RFID tag 420) associated with the user (e.g., users 44, 46, 48, 50). For example, user 50 may wear a badge that includes RFID tag 420. If user 50 enters meeting room 406 with the badge (and, e.g., RFID tag 420), RFID tag reader 422 positioned near the entrance of meeting room 406 may detect RFID tag 420, which may be associated with user 50. RFID tag reader 422 may be in communication with network 22 and may inform MH process 10 of the location (e.g., meeting room 406) of user 50.

In an implementation, determining 102 if the user (e.g., users 44, 46, 48, 50) is in a meeting (e.g., meeting 402) may include monitoring 116c a routing of IP packets associated with the computer system (e.g., computer systems 408, 410, 412, 414) associated with the user (e.g., users 44, 46, 48, 50). For example, if computer system 414 associated with user 50 sends and/or receives a communication (i.e., one or more IP packets) while in meeting room 406 (i.e., before hibernation), it may do so via router 424 associated with meeting room 406. MH process 10 may monitor the routing of these IP packets and learn that they reach computer system 414 via router 424 associated with meeting room 406 and/or leave computer system 414 and travel through router 424. Router 424 may be in communication with network 22 and may inform MH process 10 of the location (e.g., meeting room 406) or user 50. Further, determining 102 if the user (e.g., users 44, 46, 48, 50) is in a meeting (e.g., meeting 402) may include determining 116d a proximity of the computer system (e.g., computer systems 408, 410, 412, 414) associated with the user (e.g., users 44, 46, 48, 50) relative to other computer systems (e.g., one or more of computer systems 408, 410, 412, 414 and/or base computer system 404).

Figure 7:
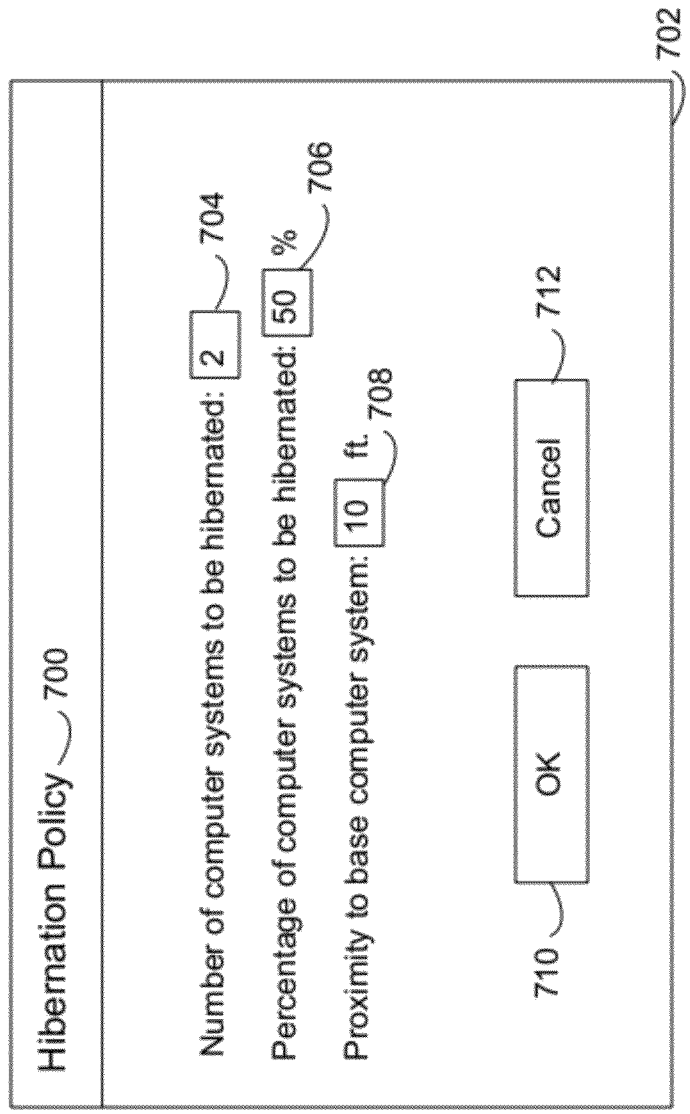
FIG. 7 is also an exemplary graphical user interface which may be associated with the meeting hibernation process of FIG. 1.

As discussed above, MH process 10 may hibernate 104 a computer system (e.g., computer systems 408, 410, 412, 414) associated with the user (e.g., users 44, 46, 48, 50) based upon, at least in part, a hibernation policy. Referring now to FIG. 7, the hibernation policy (e.g., hibernation policy 700) may include (118) at least in part, at least one of a number of computer systems to be hibernated during the meeting and a percentage of computer systems to be hibernated during the meeting. The minimum number of computer systems (e.g., computer systems 408, 410, 412, 414) to be hibernated during the meeting (e.g., meeting 402) may be entered by the user (e.g., users 44, 46, 48, 50) in field 704 via popup interface 702. Further, the minimum percentage of computer systems (e.g., computer systems 408, 410, 412, 414) to be hibernated during the meeting (e.g., meeting 402) may be entered by the user (e.g., users 44, 46, 48, 50) in field 706 via popup interface 702. MH process 10 may be configured to ensure that at least the number of computer systems entered in field 704 and/or at least the minimum percentage of computer systems entered in field 706 are hibernated during meeting 402 by forcing the corresponding number of computer systems closest in proximity to the base computer system into hibernation during meeting 402. MH process 10 may reconcile the number of computer systems entered in field 704 and/or the minimum percentage of computer systems entered in field 706 by using the greater of the number and the minimum percentage, if necessary.

Hibernation policy 700 may also include a proximity that the computer system (e.g., computer systems 408, 410, 412, 414) must be within, relative to the base computer system, in order to be hibernated by MH process 10. The proximity may be entered by the user (e.g., users 44, 46, 48, 50) in field 708 via popup interface 702. The user (e.g., users 44, 46, 48, 50) may configure hibernation policy 700 via popup interface 702 and may further either select button 710 to accept the hibernation policy configuration, or button 712 to cancel. In an implementation, hibernation policy 700 may be configured by an administrator of network 22. In this way, MH process 10 may hibernate 124 a plurality of computer systems (e.g., computer systems 408, 410, 412, 414) based upon, at least in part, hibernation policy 700. Further, MH process 10 may allow large amounts of energy to be saved by hibernating 124 a plurality of computer systems.

It should be noted that various interfaces (e.g., popup interfaces 602, 702) described herein may be accessed by one or more users (e.g., users 44, 46, 48, 50) through one or more of an email, calendaring, and schedule application, an instant message application, or another application with which MH process 10 runs in association with. It should further be noted that while various examples and implementations are discussed above in connection with MH process 10, other configurations are possible. For example, users may attend meetings without laptops and may be associated with one or more desktops which may they have leave powered in their workspaces (e.g., offices, cubicles, etc.). MH process 10 may also hibernate these desktops in a manner similar to that described above, and may also provide an indication of a sent communication associated with those users to a base computer system designated in connection with those users.

It should also be noted that while MH process 10 is described above in connection with meeting 402, other configurations are possible. For example, MH process 10 may also be applied to large meetings or presentations taking place in large lecture halls with a large number of attendees. These attendees may enter and leave the large meetings many times, and MH process 10 may hibernate/wake-up computer systems associated with these attendees on an ad-hoc basis as they come and go. Further, one or more base computer systems designated in connection with these large meetings may be associated with one or more attendees that may also enter and leave the large meetings many times. In this type of situation, MH process 10 may also designate base computer systems on an ad-hoc basis, as the designated base computer systems may enter and leave the large presentations with the attendees associated therewith.

As will be appreciated by one skilled in the art, aspects of the present invention may be embodied as a system, apparatus, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer (i.e., a client electronic device), partly on the user's computer, as a stand-alone software package, partly on the user's computer and partly on a remote computer or entirely on the remote computer or server (i.e., a server computer). In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention may be described with reference to flowchart illustrations and/or block diagrams of methods, apparatus (systems) and/or computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures may illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Further, one or more blocks shown in the block diagrams and/or flowchart illustration may not be performed in some implementations or may not be required in some implementations. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

A number of embodiments and implementations have been described. Nevertheless, it will be understood that various modifications may be made. Accordingly, other embodiments and implementations are within the scope of the following claims.

What is claimed is:

1. A method comprising:
   designating a base computer system of a meeting;
   determining if a user is in the meeting including determining a proximity of a computer system associated with the user to other computer systems;
   hibernating the computer system associated with the user based upon, at least in part, a hibernation policy, if it is determined that the user is in the meeting, the hibernation policy including a proximity that the computer system associated with the user must be within relative to the base computer system to be hibernated; and
   providing an indication to the base computer system that the user has been sent a communication to the computer system associated with the user;
   determining if there is a wake-up trigger for the computer system associated with the user based upon, at least in part, a wake-up policy, wherein the wake-up policy is based upon, at least in part, at least one of: an organizational hierarchy, a corporate directory, a social network, and a trust relationship; and
   waking up the computer system associated with the user based upon, at least in part, the wake-up trigger.

2. The method of claim 1, further comprising:
   designating the user as online by proxy via the base computer system; and
   providing a status indicating that the user is online by proxy.

3. The method of claim 1 wherein the indication-provided to the base computer system that the user has been sent the communication corresponds to the wake-up trigger.

4. The method of claim 1, wherein determining if the user is in the meeting comprises at least one of:
   determining if the meeting is scheduled in a calendar associated with the user;
   determining a location of the user based upon, at least in part, an RFID tag associated with the user; and
   monitoring a routing of IP packets associated with the computer system associated with the user.

5. The method of claim 1 wherein the hibernation policy includes, at least in part, at least one of: a number of computer systems to be hibernated during the meeting, and a percentage of computer systems to be hibernated during the meeting.

6. The method of claim 1, wherein the wake-up trigger is at least one of:
   a sent email, a sent instant message, a sent social networking message, and a newsfeed.

7. The method of claim 1, further comprising:
   hibernating a plurality of computer systems based upon, at least in part the hibernation policy.

8. A computer program product residing on a non-transitory computer readable storage medium having a plurality of instructions stored thereon, which, when executed by a processor, cause the processor to perform operations comprising:

designating a base computer system of a meeting;

determining if a user is in the meeting including determining a proximity of a computer system associated with the user to other computer systems;

hibernating the computer system associated with the user based upon, at least in part, a hibernation policy, if it is determined that the user is in the meeting, the hibernation policy including a proximity that the computer system associated with the user must be within relative to the base computer system to be hibernated; and providing an indication to the base computer system that the user has been sent a communication to the computer system associated with the user;

determining if there is a wake-up trigger for the computer system associated with the user based upon, at least in part, a wake-up policy, wherein the wake-up policy is based upon, at least in part, at least one of: an organizational hierarchy, a corporate directory, a social network, and a trust relationship; and waking up the computer system associated with the user based upon, at least in part, the wake-up trigger.

9. The computer program product of claim 8, further comprising instructions for:

designating the user as online by proxy via the base computer system; and providing a status indicating that the user is online by proxy.

10. The computer program product of claim 8 wherein the indication provided to the base computer system that the user has been sent the communication corresponds to the wake-up trigger.

11. The computer program product of claim 8, wherein determining if the user is in the meeting comprises at least one of:

determining if the meeting is scheduled in a calendar associated with the user;

determining a location of the user based upon, at least in part, an RFID tag associated with the user; and monitoring a routing of IP packets associated with the computer system associated with the user.

12. The computer program product of claim 8, wherein the hibernation policy includes, at least in part, at least one of: a number of computer systems to be hibernated during the meeting, and a percentage of computer systems to be hibernated during the meeting.

13. The computer program product of claim 8, wherein the wake-up trigger is at least one of: a sent email, a sent instant message, a sent social networking message, and a newsfeed.

14. The computer program product of claim 8, further comprising instructions for:

hibernating a plurality of computer systems based upon, at least in part the hibernation policy.

15. A computing system comprising:

at least one processor;

at least one memory architecture coupled with the at least one processor;

a first software module executed on the at least one processor and the at least one memory architecture, wherein the first software module is configured to designate a base computer system of a meeting;

a second software module executed on the at least one processor and the at least one memory architecture, wherein the second software module is configured to determine if a user is in the meeting including determining a proximity of a computer system associated with the user to other computer systems;

a third software module executed on the at least one processor and the at least one memory architecture, wherein the third software module is configured to hibernate the computer system associated with the user based upon, at least in part, a hibernation policy, if it is determined that the user is in the meeting, the hibernation policy including a proximity that the computer system associated with the user must be within relative to the base computer system to be hibernated; and a fourth software module executed on the at least one processor and the at least one memory architecture, wherein the fourth software module is configured to provide an indication to the base computer system that the user has been sent a communication to the computer system associated with the user;

a fifth software module executed on the at least one processor and the at least one memory architecture, wherein the fifth software module is configured to determine if there is a wake-up trigger for the computer system associated with the user based upon, at least in part, a wake-up policy, wherein the wake-up policy is based upon, at least in part, at least one of: an organizational hierarchy, a corporate directory, a social network, and a trust relationship; and a sixth software module executed on the at least one processor and the at least one memory architecture, wherein the fifth software module is configured to wake up the computer system associated with the user based upon, at least in part, the wake-up trigger.

16. The computing system of claim 15, further comprising:

a seventh software module executed on the at least one processor and the at least one memory architecture, wherein the fifth software module is configured to designate the user as online by proxy via the base computer system; and a eighth software module executed on the at least one processor and the at least one memory architecture, wherein the sixth software module is configured to provide a status indicating that the user is online by proxy.

* * * * *